United States Patent [19]

Knox

[11] Patent Number: 5,676,347
[45] Date of Patent: Oct. 14, 1997

[54] VALVE WITH ADJUSTABLY PRESSURIZED SEALING GASKETS

[76] Inventor: Granville S. Knox, 1323 Santa Margarita, Fallbrook, Calif. 92028

[21] Appl. No.: 653,719

[22] Filed: May 23, 1996

Related U.S. Application Data

[63] Continuation-in-part of Ser. No. 552,142, Aug. 31, 1995, Pat. No. 5,549,275.

[51] Int. Cl.$^6$ ............................................. F16B 5/20
[52] U.S. Cl. .................................. 251/170; 251/171
[58] Field of Search ............................ 251/170, 157, 251/159, 161, 188; 137/241

[56] References Cited

U.S. PATENT DOCUMENTS

| | | |
|---|---|---|
| 2,315,058 | 3/1943 | Holt et al. . |
| 2,863,629 | 12/1958 | Knox . |
| 3,064,938 | 11/1962 | Knox . |
| 3,254,873 | 6/1966 | Knox . |
| 3,901,474 | 8/1975 | Kubota . |
| 4,434,967 | 3/1984 | Vanderburg ................ 251/327 X |

Primary Examiner—John Fox
Attorney, Agent, or Firm—William W. Haefliger

[57] ABSTRACT

A valve mechanism for installation in a pipe line for controlling the movement of a flowable material therein that comprises a central body section with end sections connected thereto and forming therewith a valve stopper chamber, the end sections each having an associated annular extension projecting into the valve stopper chamber and having an external sealing surface and an internal fluid-flow passage extending outwardly therefrom; a valve stopper in the chamber having a flow passage extending therethrough and sealing surfaces bounding the flow passage; a structure for moving the stopper to a valve open position substantially aligning the stopper flow passage with the extension flow passages, and to a valve closed position with the stopper sealing surfaces extending beyond the annular inner face of the extension; an annular gasket encircling each end section extension and thrust structure operable to compress the gaskets against the sealing surfaces of the extensions and stopper when the stopper is in valve open and valve closed positions; the thrust structure being operated by a plurality of solid parts sealably housed within the valve stopper chamber.

16 Claims, 10 Drawing Sheets

VALVE WITH ADJUSTABLY PRESSURIZED SEALING GASKETS

This application is a continuation-in-part of prior U.S. application Ser. No. 08/552,142 filed Aug. 31, 1995, now U.S. Pat. No. 5,549,275.

BACKGROUND OF THE INVENTION

This invention relates generally to gasket sealed valves of ball type; and more particularly concerns pressurization of such gaskets.

There is need for provision of a valve for pipe line use wherein the working parts of the valve can be maintained in a closed and sealed valve stopper chamber, out of communication with the flowable material in the pipe line, when the valve stopper is in its valve open and valve closed positions.

This feature is very important for standby or safety shut-off valves where the valve stopper normally remains in one position for long periods of time. Often, the position of the valve stopper of such valves is changed only when there is some unusual pipe line emergency.

Pipe lines often carry flowable materials containing varying amounts of very small, solid particles. The solid particles have a tendency to "settle out" in the quiet flow zones of valve stopper chambers that are not completely closed and sealed. Over time, an accumulation of solid particles in the valve stopper chamber may seriously interfere with the working parts of the valve.

There is also a need to provide means for equalizing the thrusting force applied to each sealing gasket during and after the sealing operation has taken place, in order that variations in fluid pressure acting against the valve stopper will not change the effectiveness of the sealing gaskets.

Assume, for instance, that after the valve stopper has been moved to the "valve closed" position, there is an increase in fluid pressure on one side of the valve stopper and little or no fluid pressure on the other side of the stopper. Because of trunnion bearing clearances, the stopper tends to move towards the low pressure side, and would normally tend to decrease the thrusting force being exerted against the gasket on the high pressure side. There is need for means operable to assure that the thrusting force exerted against each gasket remains substantially the same.

SUMMARY OF THE INVENTION

It is a major object of the invention to provide means meeting the above needs. Basically, the improved valve mechanism of the invention is installable in a pipe line, for controlling movement of a flowable material, and comprises:

a) a central body section with end sections connected thereto and forming therewith a valve stopper chamber, the end sections each having an associated annular extension projecting into the valve stopper chamber with fluid-flow passages extending outwardly therefrom, and external sealing surfaces bounding the flow passages, b) a valve stopper in the chamber having a flow passage extending therethrough and sealing surfaces bounding the flow passage, c) means for moving the stopper to a valve open position substantially aligning the stopper flow passage with the end section flow passages, and to a valve closed position blocking the end section flow passages, d) a gasket encircling each end section extension, and thrust means operable to pressurize or squeeze the gaskets against the stopper sealing surfaces and against the extension sealing surfaces when the stopper is in valve open and valve closed positions.

As will be seen, the thrust means may advantageously comprise thrustors extending at least part way about the end sections, to be displaced for pressurizing the gaskets.

Another object includes the provision of actuator means that includes structure to simultaneously displace the thrustors relative to the end sections. Such actuator means may advantageously comprise an actuator bar extending between the thrustors to apply displacing force thereto, and in response to bar displacement relative to the end extensions, and an actuator member adjustably movable to displace the bar, and to hold the bar in displaced position, thereby to maintain force application to the bar. The actuator member is preferably positioned to transmit displacing force to the bar intermediate the thrustors, thereby to substantially equalize force transmission to the thrusters by the bar. Also, the bar and thrustors are preferably protectively enclosed and sealed within the valve stopper chamber, as will be seen.

Yet another object is to provide actuator means that includes a threaded part with which the member has threaded interfit, whereby rotation of the part effects advancement of the member to displace the bar. The actuator member typically interfits the bar at a location characterized in that the bar is displaced to effect substantially equalized force transmission to the thrustors.

A further object includes the provision of thrustors in the form of two rings rotatable about the end extents and axially movable relative thereto. Camming means is typically provided for effecting axial movement of the rings in response to ring rotation about the end extents, the actuator means operable to effect ring rotation about the end extents. Such camming means may advantageously include multiple sets of conical surfaces on the rings and on the end sections, the surfaces facing one another, and balls located between and engaging the conical surfaces.

A yet further object includes the provision of blocking means to block pressurization of the gaskets at times when the stopper is not in a valve open or valve closed position. Such blocking means may block access to the actuator means during movement of the stopper between valve open and valve closed positions, while allowing access to the actuator means when the stopper is in its valve open and valve closed positions. For this purpose, a plate may be provided to be movable in conjunction with movement of the means for moving the stopper, the plate having two holes, one of which is in registration with the actuator means in valve open position of the stopper, and the other of which is in registration with the actuator means in valve closed position of the stopper.

Another object of the invention is to provide means for "jet cleaning" or "steam cleaning" working parts of the valve, while it remains in service on the pipe line. This is made possible by providing one or more normally closed openings, extending through the central body wall into the closed valve stopper chamber. This is a very desirable feature for valves installed in pipe lines handling cement slurries, and also on pipe lines handling tar-like fluids.

Another major object is to provide a simple mechanism for pressurizing the two opposed gaskets, and comprising a plurality of compact, torque-operated parts that can be housed and sealed within the confines of a relatively small valve stopper chamber. The solution of this problem, as shown by the attached drawings, has provided several new, and very desirable, features.

First, the positioning of the two gaskets is such that, when pressurized, they seal the valve stopper chamber in a manner that would block any leakage of flow line fluids through the joints between the central body section and the end pieces. In the same manner, any valve stem leakage would also be blocked from escape to the atmosphere.

Many years ago a small leakage from a valve was thought of as an objectionable nuisance. Today, with governmental regulations dealing with environmental safety, and soil pollution, a small leakage is thought of as a major problem.

An important aspect of the invention concerns the relocation of the conical camming surfaces from the body end sections, and onto a separate camming plate, providing greatly widened options in the selection of a corrosion resistant material for the body end pieces. Before this change, it had been necessary to use a high tensile strength, heat treatable steel for the end sections, so that the camming surfaces could be flame hardened to prevent undesirable brinelling of the camming surfaces.

Another improvement in construction concerns prevention of rotation of the thrustors as they move axially to compress the gaskets. This eliminates wear on the much softer gasket material, and also eliminates heavy sliding friction between the axially movable thrustor and the actuator bar, which has limited axial movement. The actuator bar now engages and rotates the camming plate, but there is no sliding friction between the two parts.

An improvement to the actuator bar provides a new and useful function, the cross sectional area of the bar being reduced and the tensile strength of the materials in the bar increased. The bar is designed to deflect slightly when a strong force is applied to the center of the bar. This flexing stores energy in the bar, which is useful in maintaining a relatively uniform pressure against the gaskets when they are pressurized. This compensates for the slight expansion and contracting of the body and end sections in response to changes in temperature or pressure.

These and other objects and advantages of the invention, as well as the details of an illustrative embodiment, will be more fully understood from the following specification and drawings, in which:

DETAILED DESCRIPTION

In FIGS. 1–4, the valve includes a flanged body 10 and flanged end sections, or caps, 11 and 12 connected to the body by stud bolts 11b and 12b. A valve chamber 13 is thereby formed, to have coaxial flow inlet and outlet ports, as for example at 14a and 14b. See axis 43. Flow may pass either way through the valve. A valve stopper 15 in the general form of a spherical plug is located in the chamber 13 for rotation therein about an axis 16, which may extend vertically, as shown. Such rotation through ninety degrees carries a horizontal passage 17 through the stopper into and out of registration with the horizontal ports 14a and 14b, for controlling fluid flow through the valve.

Figure 1:
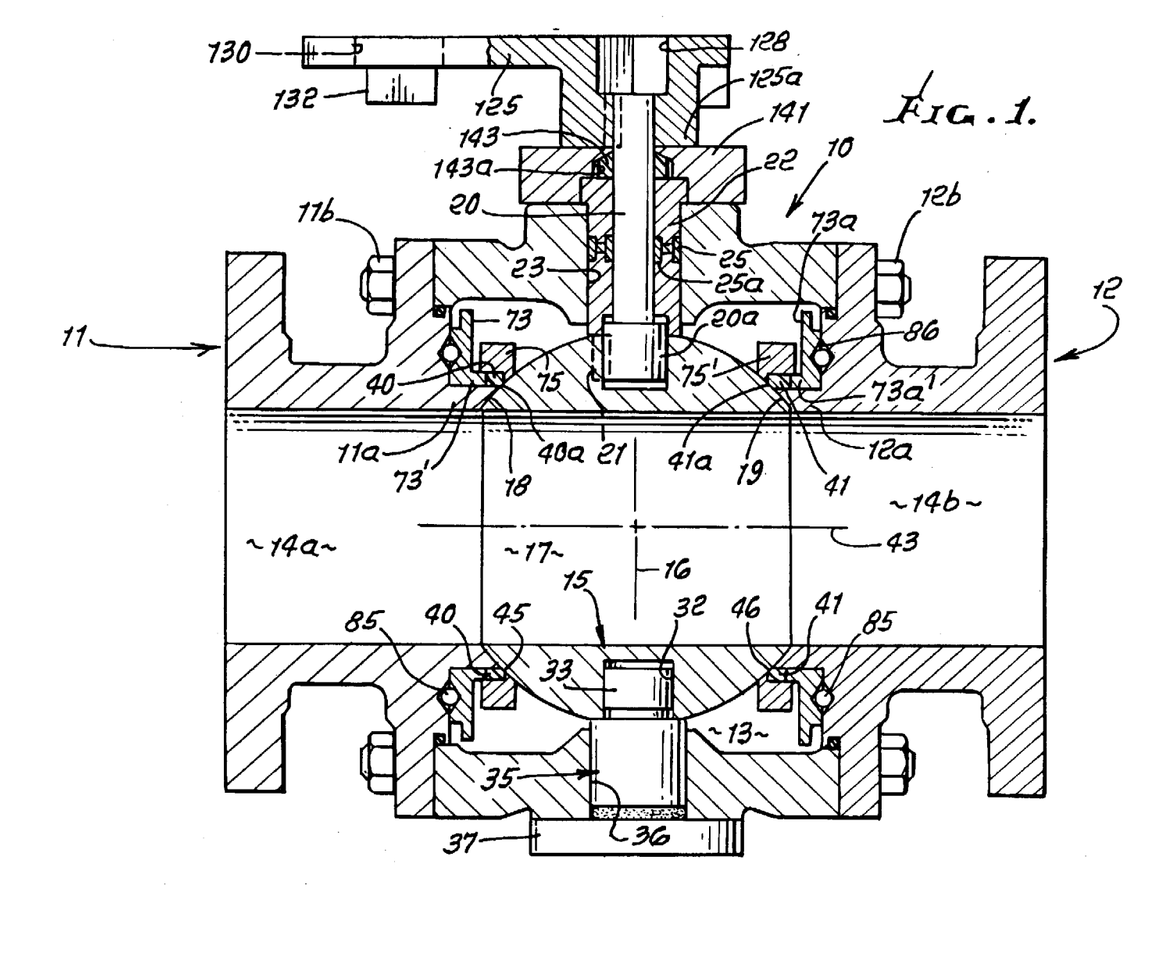
FIG. 1 is a vertical section taken through a preferred form of the valve.
Figure 2:
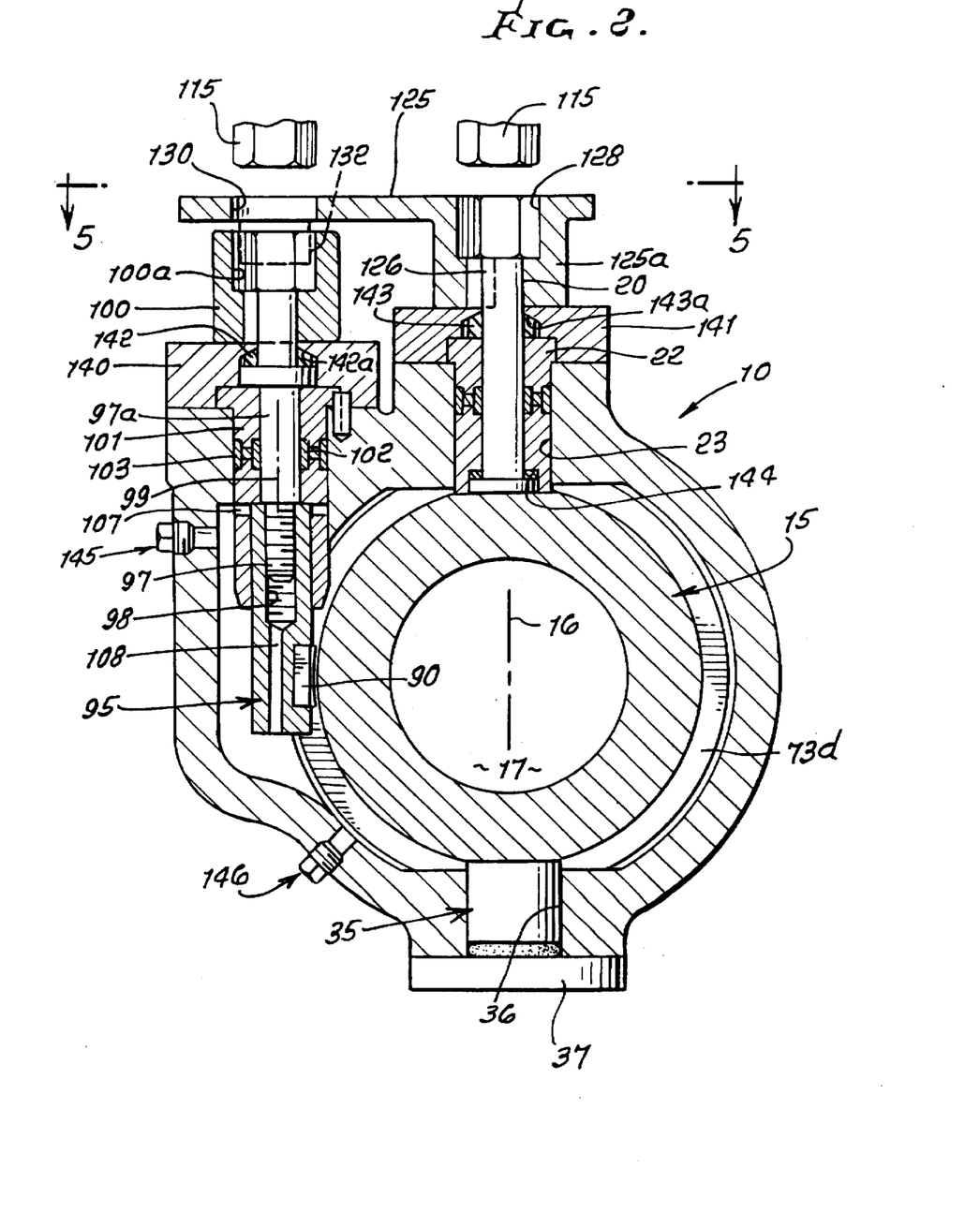
FIG. 2 is a vertical section taken through the FIG. 1 valve and taken at right angles thereto.

In general, there is a slight clearance between the stopper surface and the spherical, concave surfaces 18 and 19 of the end sections 11a and 12a, so that the stopper may be readily turned within the chamber by rotation of the vertical spindle 20, to the lower, enlarged end 20a of which the stopper is keyed at 21. The spindle is centered with respect to axis 16 by a bushing 22 received within a vertical bore 23 in body 10, the bushing containing a pair of annular recesses 25 and 25a sealed with plastic packing injected under pressure to seal off between the bushing and the spindle, and also between the bushing and bore 23.

At the opposite, solid side of the stopper, a recess 32 is sunk therein to receive a bearing assembly 33, which may include a race and needle bearings (not shown) to enable stopper rotation about the axis 16 of fixed trunnion 35. The latter is received within a bore 36 in body 10. Cap 37 extends over the end of trunnion 35.

The two end sections or caps 11 and 12 are shown to include coaxial annular extensions 11a and 12a that extend or project into the chamber 13, as shown. The end sections and extensions form fluid flow passages, such as ports 14a and 14b referred to above.

Two gaskets 40 and 41 encircle the respective two annular extensions 11a and 12a, in positions to receive thrust exerted in the direction of axis 43, to press against the stopper sealing surfaces indicated at 45 and 46 as extending annularly about axis 43, and also against the extension outer sealing surfaces, which the stopper is in valve open and also in valve closed positions. Such extension outer sealing surfaces are indicated at 11a' and 12a', in FIG. 10. Note that the gaskets have angled stopper engagement surfaces 40a and 41a. See also FIGS. 7 and 8.

Thrust means, including thrustors, are provided, as at 73 and 73a, to extend at least part way about the extensions 11a and 12a, and to be displaced for pressurizing the two gaskets. The thrustors may take the form of annuli, as shown, having annular lips 73' and 73a' projecting toward the gaskets.

The sealing gaskets may comprise a material known as Teflon, which is the trade name for polymerized tetrafluoroethylene; or if temperature conditions are extremely high, a preformed packing annulus of asbestos material may be used. The sealing gaskets are required to seal off only when squeezed by thrust members 73 and 73a, and therefore do not necessarily need to be precision molded into a close-fitting ring, and the material need not be resilient.

Figure 7:
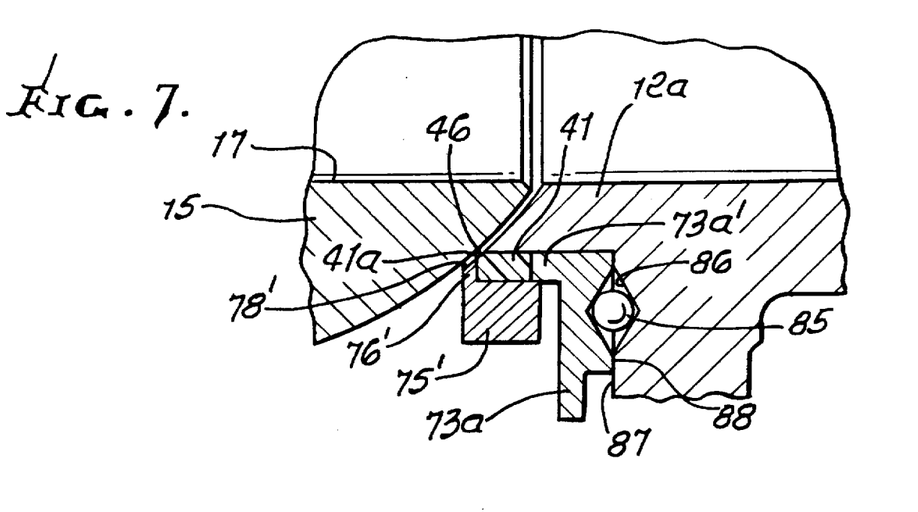
FIGS. 7 and 8 are views showing stages in operation of thrust mechanism.
Figure 8:
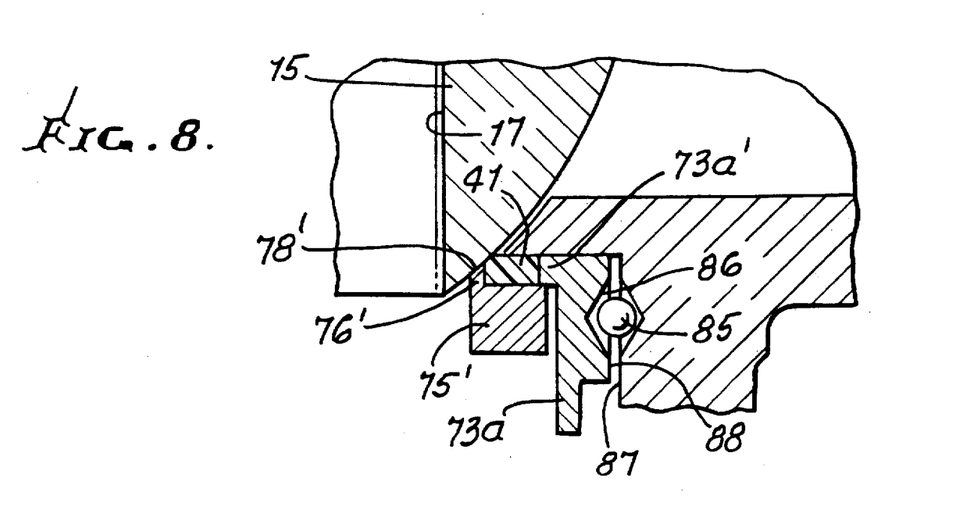

Spaced radially outwardly from the extension 12a is a metallic ring 75', which is mounted on the lip 73a', and projects at 76' between a shoulder portion of the packing and stopper 15, the ring 75' having a terminal annular surface 78', which may be spherically concave to fit the stopper surface, as seen in FIG. 8, when the packing or gasket 41 is pressurized. The surface 78' may be spaced slightly from the stopper surface, as in FIG. 7, to allow stopper rotation without interference, when the packing 41 is not pressurized. Corresponding elements are provided, as respects ring 75 and gasket or packing 40.

When the thrust members 73 and 73a are simultaneously rotated about the extension 11a and 12a, and displaced bodily toward the gaskets 40 and 41, they transmit thrust acting to press the gaskets against the stopper 15, the extensions 11a and 12a, and the ring portions 76 and 76', whereby seals are effected. Such pressurizing of the gaskets into pressural engagement with the stopper 15 serves to carry the rings 75 and 75', and ring portions 76 and 76' bodily with the gaskets into engagement with the stopper surface, thereby eliminating the clearances between ring surfaces 78 and 78', and the stopper surface.

The thrust members 73 and 73a are simultaneously rotated about the extensions 11a and 12a, and displaced axially toward one another, as described above, by actuating cam mechanism. This rotary movement of each thrust ring is accompanied by axially bodily displacement thereof along axis 43, as a result of the camming action of a plurality of balls 85 carried in opposite conical recesses 86 circularly spaced about axis 43. As seen in FIGS. 7 and 8, recesses 86 are formed in opposite faces 87 and 88 of the body cap 12, and thrust member 73a, respectively.

Prior to rotation of the thrust ring member 73a, the balls are centered in the recesses 86, so that the thrust ring 73a is in an axial position close to the face 87 on the body cap 12. However, as the thrust ring member 73a is rotated, the balls 85, which are in the path of thrust member rotation, and which engage the walls of the recesses 86 angled in the direction of thrust ring rotation and axial advancement toward the gasket annulus, roll up the inclined recess walls substantially without friction to displace the thrust member 73a axially toward the packing annulus 41, as seen in FIG. 8. Similar structure is provided in association with thrustor 73.

Figure 3:
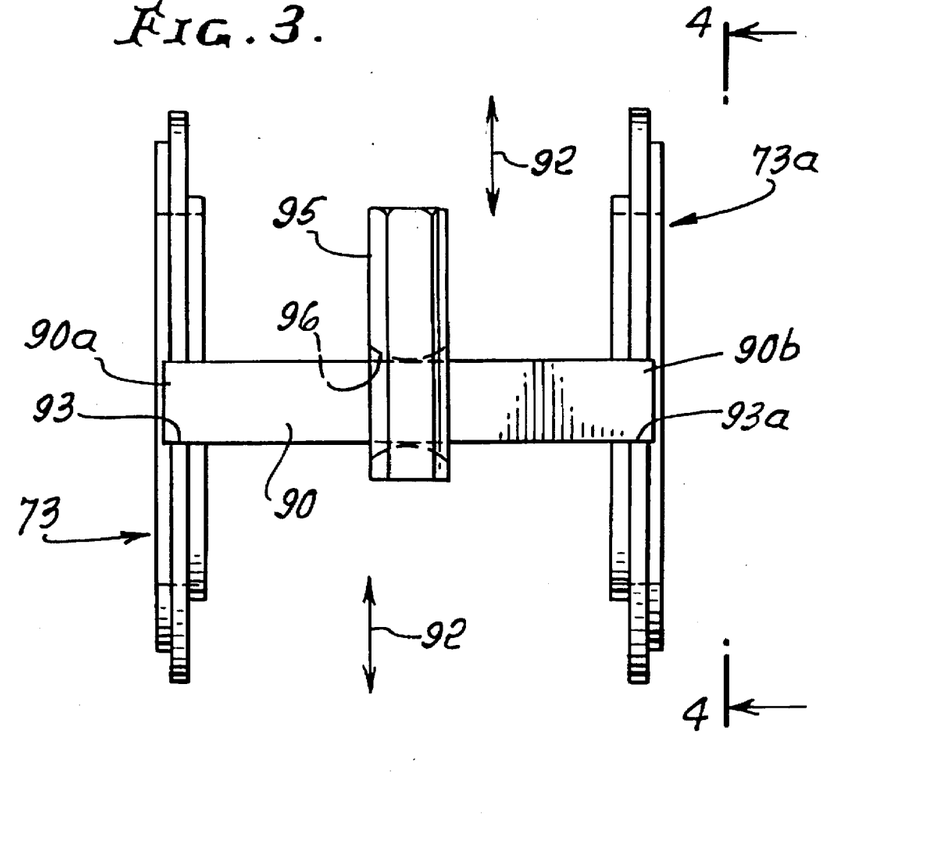
FIG. 3 is a top plan view of valve actuating mechanism.
Figure 4:
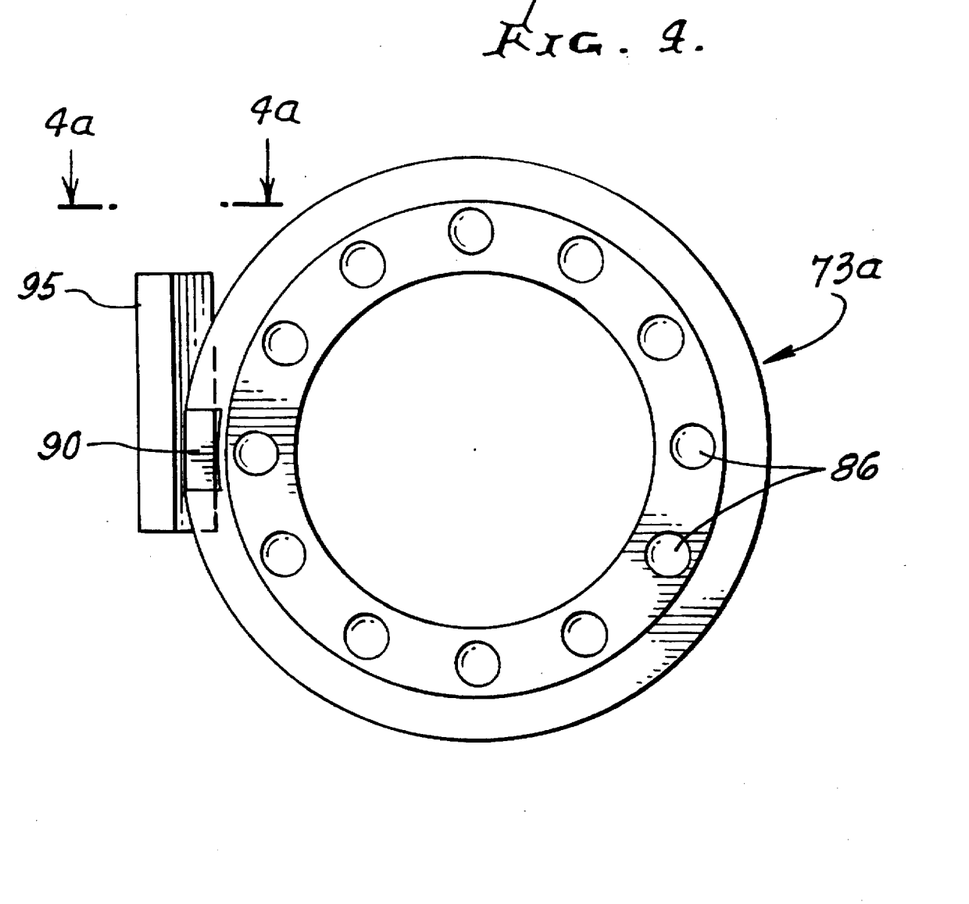
FIG. 4 is an elevational view taken on lines 4—4 of FIG. 3.
Figure 4A:
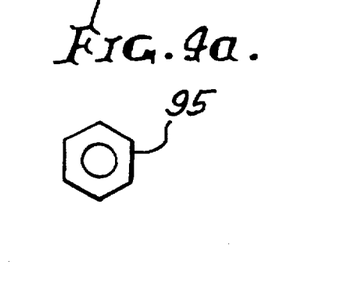
FIG. 4a is a view taken on lines 4a—4a of FIG. 4.

The actuator means includes structure to simultaneously rotate the two thrustors 73 and 73a, as described, and relative to the end sections and extensions 11a and 11b. Such actuator means includes an actuator bar 90 extending between the thrustors 73 and 73a, as better seen in FIGS. 3 and 4, to apply displacing force thereto in directions indicated by arrows 92, normal to the laterally elongated extent of the bar. The slots 93 and 93a in the thrustors interfit with the respective opposite ends 90a and 90b of the bar. An actuator member 95 is adjustably endwise movable in the direction of arrows 92, to displace the bar. Note that the member 95 is positioned to transmit displacing force to the bar intermediate the two thrustors, thereby to substantially equalize force transmission to the two thrustors by the bar 90. As seen in FIG. 3, the member 95 forms a slot 96 within which a mid portion of the bar interfits walls 96a of the slot so that maximum pressure is applied at the center of the bar. The bar and thrustors are protectively contained within the chamber 13 and exposed thereto.

Figure 9:
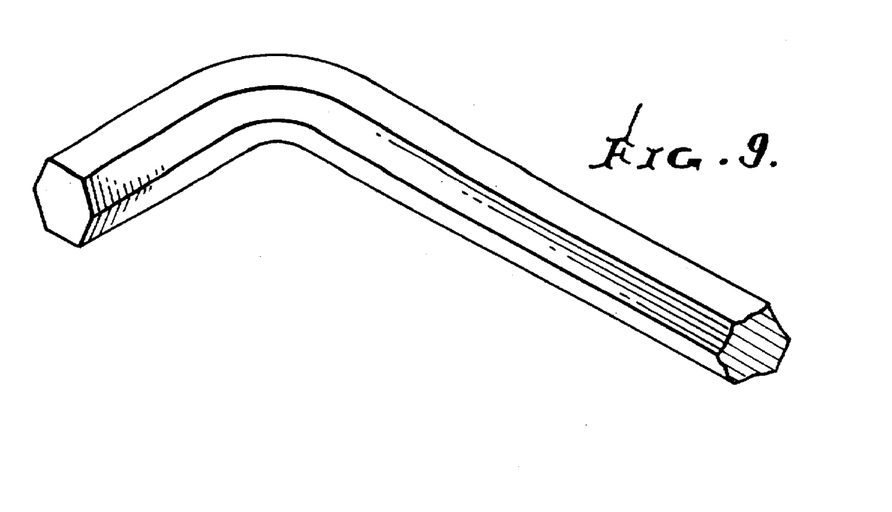
FIG. 9 is a perspective view of a tool to rotate valve actuating mechanisms.

The actuator means may also include a threaded part 97 with which actuator member 95 has threaded interfit at 98, whereby rotation of part 97 about axis 99 effects controlled displacement of the member 95 to controllably displace the bar to displace the thrustors. Elongated part 97 is integral with a stem 97a to which an external control knob or hex head 100 is keyed, whereby an external hex wrench head 115 may be fitted into the internal hex 100a formed by head 100 to rotate part 97. See also FIG. 9. A bushing 101 guidably receives the stem 97a, and seals are provided at 102 and 103. Passages 107 and 108 are provided for fluid displacement.

See also retention cap 140 and 141 suitably attached to body 10, and annular Teflon seals 142 and 143 are received in recesses 142a and 143a formed by the caps. A Teflon thrust bearing is provided at 144. Normally closed openings are provided at 145 and 146 in the wall of body 10.

Under some severe operating conditions, the normally closed openings in the central body wall 10 may be connected to a steam source, to clean collected particulate from surfaces exposed to interior chamber 13.

Figure 5:
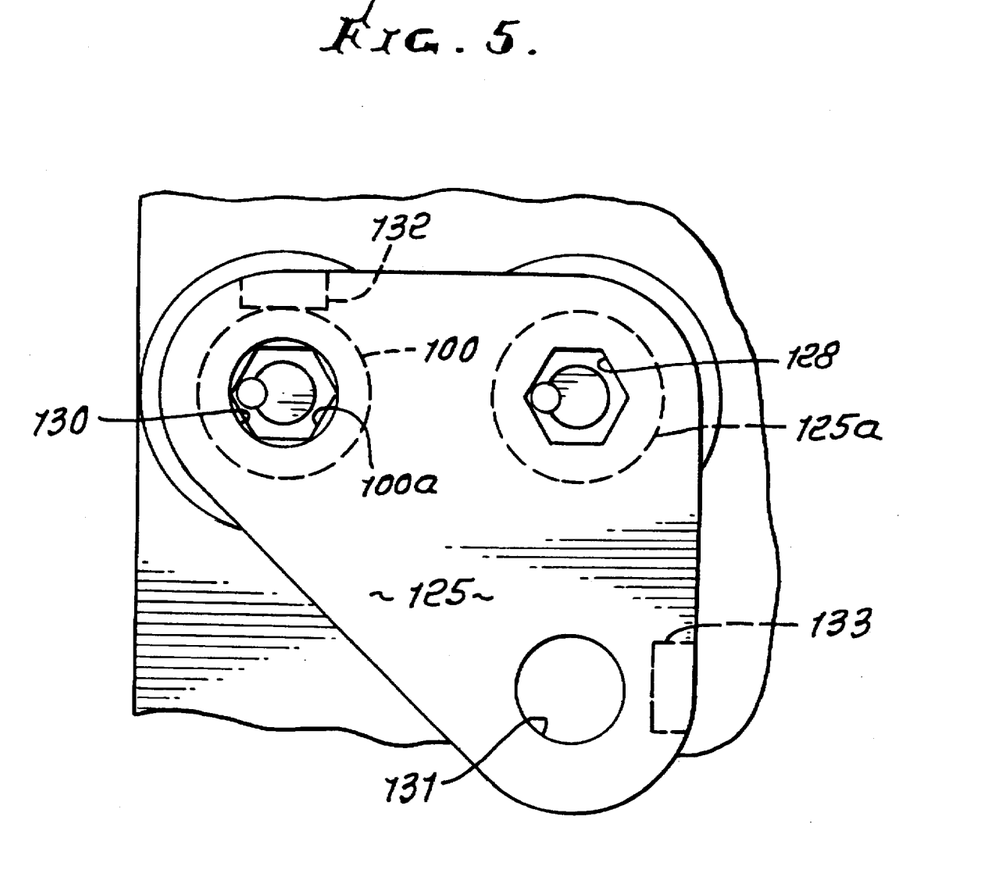
FIG. 5 is a top plan view showing blocking means to block access to the actuating mechanism when the valve is being moved between open and closed positions.
Figure 6:
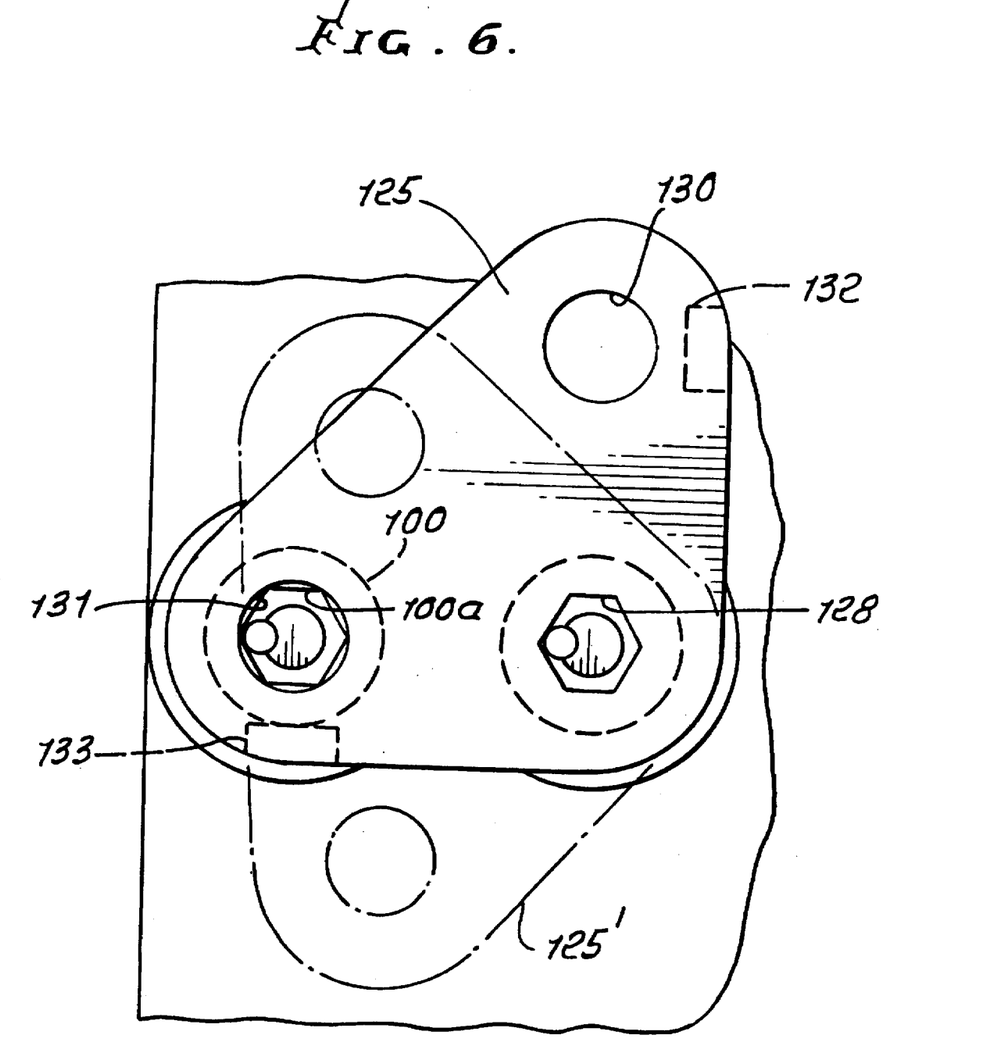
FIG. 6 is a view like FIG. 5 showing the blocking means in an alternate position.

Referring to FIGS. 5 and 6, they illustrate one form of blocking means to block pressurization of the gaskets at times when the stopper is not in the valve open or valve closed position. The blocking means shown blocks access to the actuator means, as at internal hex 100a during movement of the stopper between valve open and valve closed positions, while allowing access to the actuator means when the stopper is in each of its open (FIG. 5) and closed (FIG. 6) positions.

Such blocking means may advantageously take the form of a plate 125 movable in conjunction with movement of the means for moving the stopper, i.e., as shown in FIG. 2; plate 125 has a boss 125a keyed at 126 with stopper spindle 20, whereby the plate rotates about axis 16 when the external hex head wrench 115 is inserted into internal hex 128, and rotated. See plate intermediate position 125' in FIG. 6, for example. The plate blocks hex openings 100a, hex 128 opening always remains open, as the plate rotates between FIG. 5 and FIG. 6 positions. The plate has two holes or through openings 130 and 131, one of which (130) is in registration with the actuator means hex 100a in valve open position (FIG. 5), and the other (131) of which is in registration with the hex 100a in valve closed position (FIG. 6). See also the stops 132 and 133 alternately engageable with head 100, as shown, to limit plate rotation at the registration positions described.

Figure 10:
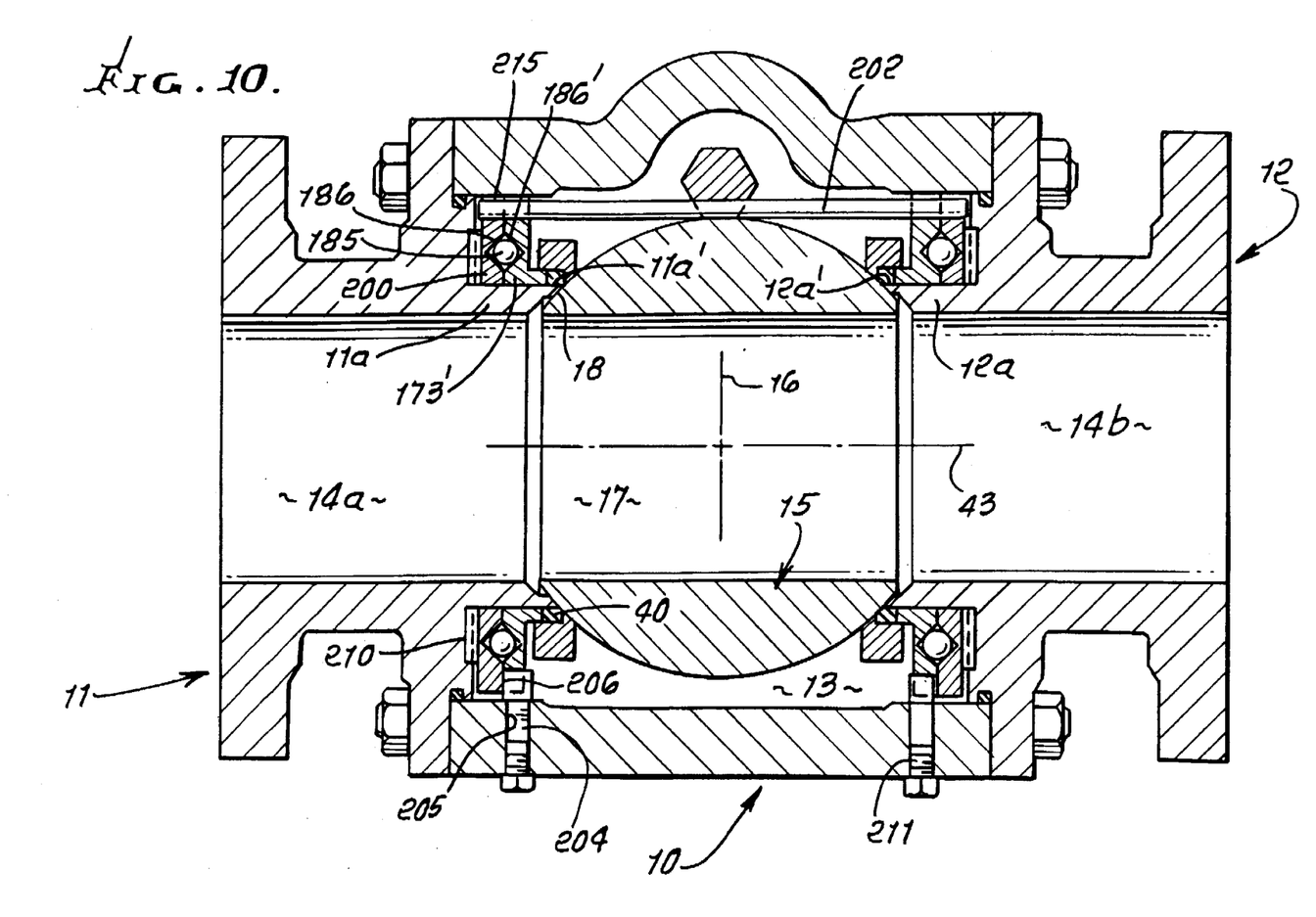
FIG. 10 is a fragmentary vertical sectional view of another preferred form of the valve.
Figure 11:
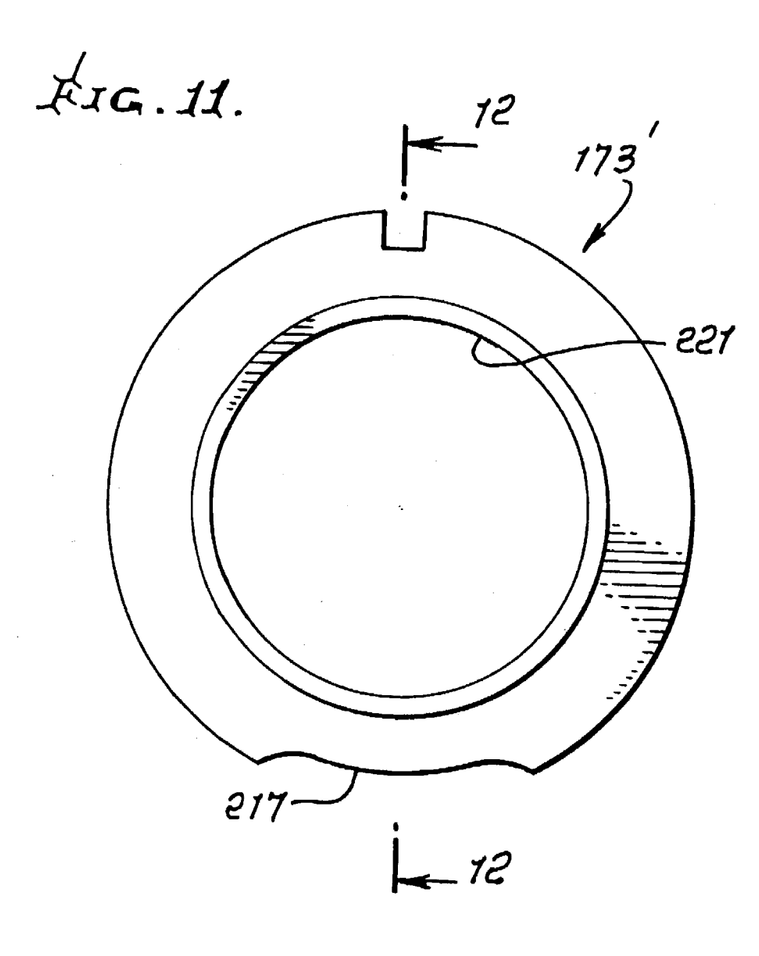
FIG. 11 is a frontal view of a thrustor, as used in the FIG. 10 valve.
Figure 12:
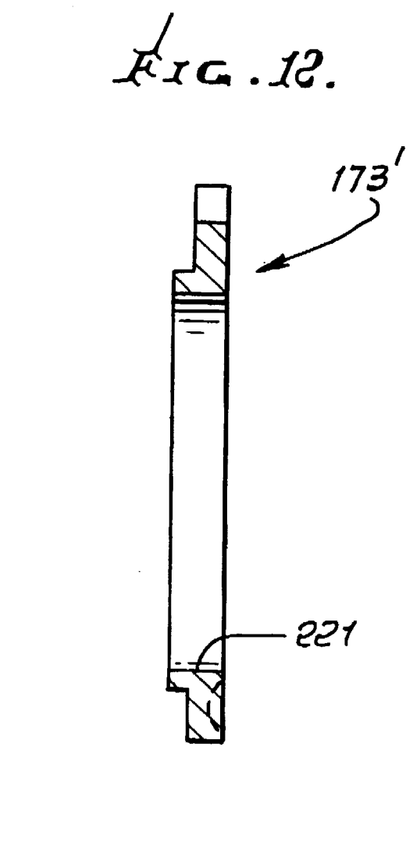
FIG. 12 is an edge view of the FIG. 11 thrustor, taken on lines 12—12 of FIG. 11.
Figure 13:
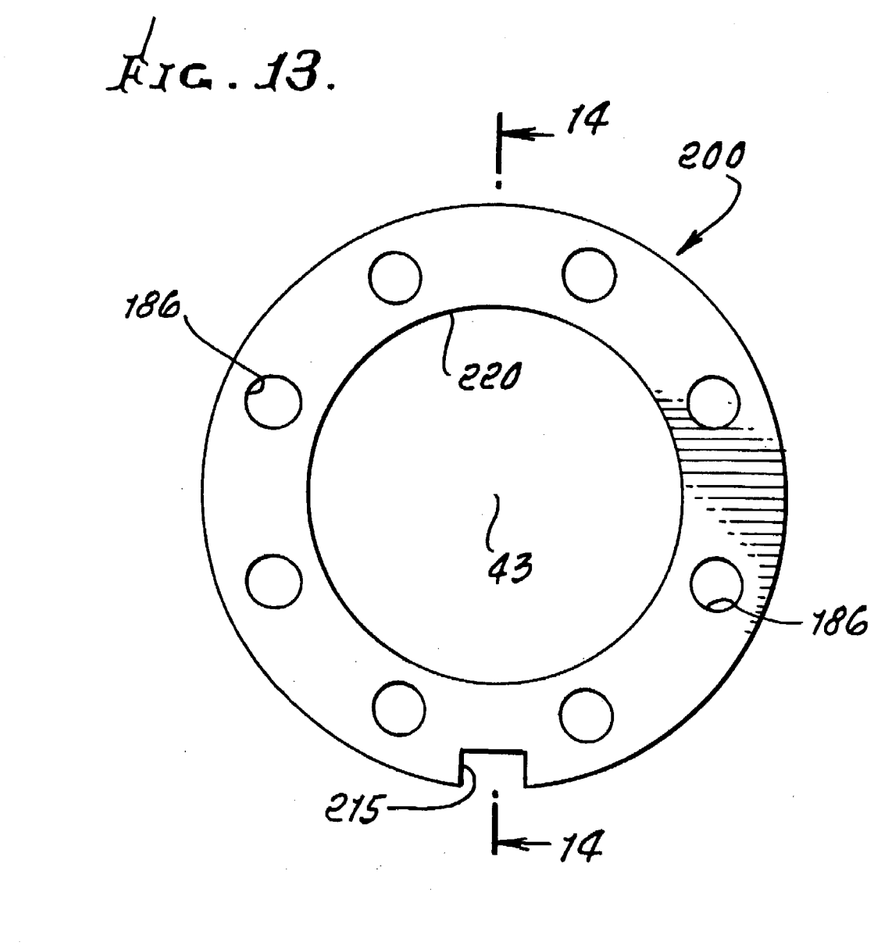
FIG. 13 is a frontal view of a camming ring, as used in the FIG. 10 valve.
Figure 14:
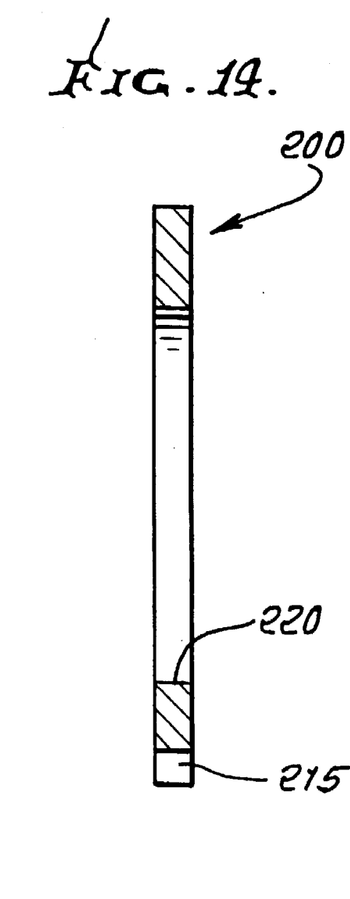
FIG. 14 is an edge view of the FIG. 13 ring, taken on lines 14—14 of FIG. 13.

Referring now to FIGS. 10–14, the modified valve includes elements the same as previously described in connection with FIGS. 1–9, except as follows, or as also described, as follows:

The thrust means is shown to include multiple, solid parts housed within the valve stopper chamber 13. Such mechanical parts are positioned within that chamber to be sealable therein, when the stopper is in valve open and valve closed positions. Such parts include two thrustors 173 and 173' having annular extents extending about the end extensions 11a and 12a, to be displaced oppositely and axially, for pressurizing the gaskets 40 and 41, as previously described; however, in this instance, the thrustors are advantageously not rotated about axis 43.

Actuator means is provided for movement to axially displace the two thrustors. Such actuator means may be considered to include camming means and actuator bar means movable to displace the camming means in directions to effect transmission of force acting to axially displace and hold the thrustors, as when the gaskets are urged against the valve stopper and extensions, as previously described.

As shown, the camming means includes two camming rings 200 and 201 extending about and positioned for rotation about the two end extensions 11a and 12a, in response to actuating movement of the actuator bar means. The latter is shown at 202, and corresponds to bar 90;

however, bar 202 effects rotation of the cammings rings, and not the thrustors, whereby the latter are not rotated. Holding means is provided to hold the thrustors against rotation with the camming rings, while allowing axial displacement of the thrustors. See in this regard keys 204 projecting from openings 205 in body section 10, and into slots 206 cut in the thrustors. Keys 204 have square heads fitting into slots 206 and cylindrical extensions fitting into openings 205 in body section 10.

Axial thrust bearings for the camming rings are shown at 210. Each key 204 and its opening 205 defines tongue and groove elements—one carried by the thrustor and the other by the central body section 10. Plug 211 closes the opening 205.

Accordingly, there are two pairs of the thrustors and camming rings, all within the interior of the body chamber 13. Roller bearings are provided to effect the camming action, in response to simultaneous rotation of the camming rings, relative to the thrustors. See the pluralities of balls 185 carried in opposite conical recesses 186 and 186' circularly spaced about axis 43, and formed in the thrustor and camming ring parts. The camming action of such balls is the same as described previously, except it is the camming ring that rotates, not the thrustor. Ring and thrustor bores appear at 220 and 221.

Note that the rotary camming ring of each pair is located further from the stopper than its associated thrustor. In this regard, the actuator bar 202 bridges or overlaps the periphery of the thrustor of each pair and extends into torque-transmitting, interfitting relation with the camming ring of each pair, as at notch location 215. Note the annular section clearance 217 provided at the thrustor periphery in FIG. 11, to allow movement of the bar 202 as the camming rings are rotated, without transmitting torque to the thrustors.

The actuator means may also be considered to include a threaded part (as at 97 in FIG. 2) positioned to effect movement of the actuator bar means 202 in response to rotation of that part, whereby the thrustors are caused to axially pressurize the gaskets, in valve open and closed positions. The gaskets, when pressurized, provide means preventing flowable material within the end sections 11a and 12a from leaking into the valve stopper chamber. The gaskets, when pressurized, also provide means for blocking leakage of flowable material within sections 11a and 12a from leaking through interfitting valve parts to the exterior of the valve.

I claim:

1. A valve mechanism for installation in a pipe line for controlling the movement of a flowable material therein, the said mechanism comprising:
    a) a central body section with end sections connected thereto and forming therewith a valve stopper chamber, said end sections each having an associated annular extension projecting into said valve stopper chamber and having an annular external sealing surface and an internal fluid-flow passage extending outwardly therefrom,
    b) a rotary valve stopper in said chamber having a flow passage extending therethrough and annular sealing surfaces bounding the flow passage,
    c) means for moving said stopper to a valve open position substantially aligning the stopper flow passage with the extension flow passages, and to a valve closed position with the stopper sealing surfaces extending beyond the annular inner face of the extension,
    d) an annular gasket encircling each end section extension and thrust means operable to compress said gaskets against the sealing surfaces of said extensions and stopper when the stopper is in valve open and valve closed positions,
    e) said thrust means including thrustors having annular extents extending about said end extensions, to be displaced for pressurizing said gaskets, and actuator means movable to axially displace and hold said thrustors,
    f) said actuator means including mechanical elements contained within the valve stopper chamber operatively coupled to both said thrustors to apply displacing force thereto in response to displacement of said elements relative to said end extensions to thereby hold the thrustors in displaced position with maintenance of force application thereto to pressurize the gaskets in both valve open and valve closed position, as aforesaid.

2. The mechanism of claim 1 wherein said thrust means is contained within the stopper chamber to be sealable therein when the stopper is in valve open and valve closed positions.

3. The mechanism of claim 1 wherein said elements include camming means, and actuator bar means movable to displace said camming means in directions to effect transmission of force acting to axially displace and hold said thrustors.

4. The mechanism of claim 3 wherein said camming means includes camming rings positioned for rotation about said end extensions in response to actuating movement of said actuator bar means.

5. The mechanism of claim 4 including holding means for holding said thrustors against rotation with said camming rings, but allowing axial displacement of said thrustors.

6. The mechanism of claim 5 wherein said holding means for each thrustor include tongue and groove elements, one element carried by the thrustor and the other element by said central body section.

7. The mechanism of claim 4 wherein said thrustors and said camming rings are within the interior of said valve stopper chamber.

8. The mechanism of claim 4 wherein there are two pairs of said thrustors and camming rings, there being roller bearings between the thrustor and camming ring of each pair.

9. The mechanism of claim 4 wherein there are two pairs of said thrustors and camming rings, the camming ring of each pair being located further from the stopper than the thrustor of that pair.

10. The mechanism of claim 9 wherein the actuator bar means overlaps the periphery of said thrustor of said pair and extends into torque-transmitting, interfitting relation with the camming ring of said pair.

11. The mechanism of claim 1 wherein the actuator means includes a threaded part positioned to effect movement of said actuator bar means in response to rotation of said threaded part.

12. The mechanism of claim 1 wherein the said gaskets, when pressurized, block communication between the valve stopper chamber and the internal flow passages, thereby blocking leakage of pipe line fluids between other interfitting valve parts.

13. The mechanism of claim 1 wherein the said gaskets, when pressurized, block communication between the valve stopper chamber and the internal flow passages, thereby blocking leakage of pipe line fluids through interfitting valve parts to the outside atmosphere.

14. The mechanism of claim 1 including a force equalizing means within the stopper chamber for applying substantially equal displacing force to each of said thrustors and said actuator means having a threaded extent and being adjustably movable to activate said force equalizing means, and thereby control the movement of said thrustors.

15. A valve mechanism for installation in a pipe line for controlling the movement of a flowable material therein, the said mechanism comprising:
   a) a central body section with end sections connected thereto and forming therewith a valve stopper chamber, said end sections each having an associated annular extension projecting into said valve stopper chamber and having an external sealing surface and an internal fluid-flow passage extending outwardly therefrom,
   b) a rotary valve stopper in said chamber having a flow passage extending therethrough and sealing surfaces bounding the flow passage,
   c) means for moving said stopper to a valve open position substantially aligning the stopper flow passage with the extension flow passages, and to a valve closed position with the stopper sealing surfaces extending beyond the annular inner face of the extension,
   d) an annular gasket encircling each end section extension and thrust means operable to pressurize said gaskets against the sealing surfaces of said extensions and stopper when the stopper is in valve open and valve closed positions,
   e) said gaskets being closely confined by interfitting valve parts when pressurized by said thrust means,
   f) said thrust means including thrustors having annular extents extending about said end extensions, to be displaced for pressurizing said gaskets,
   g) and actuator means movable to axially displace and hold said thrustors, said actuator means including mechanical elements contained within the valve stopper chamber operatively coupled to both said thrustors to simultaneously apply displacing force thereto in response to displacement of said elements relative to said end extensions to thereby hold the thrustors in displaced position with maintenance of force application thereto to pressurize the gaskets in both valve open and valve closed position, as aforesaid.

16. A valve mechanism for installation in a pipe line for controlling the movement of a flowable material therein, the said mechanism comprising:
   a) a central body section with end sections connected thereto and forming therewith a valve stopper chamber, said end sections each having an associated annular extension projecting into said stopper chamber and each extension having an external sealing surface and an internal fluid-flow passage,
   b) a rotary valve stopper in said chamber having a flow passage extending therethrough and sealing surfaces bounding the flow passage,
   c) means for moving said stopper to a valve open position substantially aligning the stopper flow passage with the extension flow passages, and to a valve closed position blocking said passages,
   d) an annular gasket encircling a portion of the external sealing surface of each extension and at times being closely confined within an enclosure formed by interfitting valve parts,
   e) and thrust means within the stopper chamber operating to press and hold said gaskets against the stopper sealing surfaces and extension sealing surfaces, when the stopper is in valve open and valve closed positions,
   f) said thrust means including thrustors having annular extents extending about said end extensions, to be displaced for pressurizing said gaskets,
   g) and actuator means movable to axially displace and hold said thrustors, said actuator means including mechanical elements contained within the valve stopper chamber operatively coupled to both said thrustors to simultaneously apply displacing force thereto in response to displacement of said elements relative to said end extensions to thereby hold the thrustors in displaced position with maintenance of force application thereto to pressurize the gaskets both valve open and valve closed position, as aforesaid.

* * * * *